(12) United States Patent
Knoplioch et al.

(10) Patent No.: US 7,558,417 B2
(45) Date of Patent: Jul. 7, 2009

(54) METHOD AND APPARATUS FOR ANALYZING THREE-DIMENSIONAL IMAGES CONTAINING VOXELS

(75) Inventors: Jérôme Knoplioch, Neuilly sur Seine (FR); Matthieu Denis Ferrant, Saint Rémy lès Chevreuse (FR); Patrick Derréal, Paris (FR)

(73) Assignee: General Electric Company, Schenectady, NY (US)

( * ) Notice: Subject to any disclaimer, the term of this patent is extended or adjusted under 35 U.S.C. 154(b) by 955 days.

(21) Appl. No.: 10/999,073

(22) Filed: Nov. 29, 2004

(65) Prior Publication Data

US 2006/0115137 A1 Jun. 1, 2006

(51) Int. Cl.
*G06K 9/36* (2006.01)
(52) U.S. Cl. .................. 382/131; 382/154; 382/256
(58) Field of Classification Search ............. 382/128, 382/131, 154, 173, 224, 225, 256, 257
See application file for complete search history.

(56) References Cited

U.S. PATENT DOCUMENTS

| | | | |
|---|---|---|---|
| 7,333,644 B2 * | 2/2008 | Jerebko et al. | 382/128 |
| 2003/0048936 A1 * | 3/2003 | Fan et al. | 382/131 |
| 2006/0247510 A1 * | 11/2006 | Wiemker et al. | 600/407 |

* cited by examiner

*Primary Examiner*—Andrew W Johns
(74) *Attorney, Agent, or Firm*—Cantor Colburn LLP (57) ABSTRACT

A method for analyzing a three-dimensional (3D) image representative of an initial volume of interest (VOI) containing a lesion is disclosed. The 3D image has an associated binary map having voxels associated with a thresholded variance map of the initial VOI. The initial VOI has boundaries that may be defined by a cube. A final VOI is determined that is less than the initial VOI, where the final VOI is a function of the number of transitions from a boundary voxel to a filtered voxel at an outer boundary of the lesion. The final VOI is then analyzed to determine a nodule consistency class, classified based upon the computed nodule consistency class by applying a voxel-clustering algorithm, and displayed with respect to three classifications of tissue.

19 Claims, 6 Drawing Sheets

METHOD AND APPARATUS FOR ANALYZING THREE-DIMENSIONAL IMAGES CONTAINING VOXELS

BACKGROUND OF THE INVENTION

The present disclosure relates generally to a method and apparatus for analyzing three-dimensional (3D) images, and particularly to a method and apparatus for analyzing a 3D image representative of a lesion found in a CT (computed tomography) image of a lung.

CT imaging provides a description of anatomy in great detail and is therefore being increasingly used for detecting and following the evolution of lesions that may be potential cancers. The follow-up of lesion size and other characteristics is being used for determining lesion malignancy, or to assess the effectiveness of a therapeutic regimen. Current algorithms and applications are available for automatically segmenting and sizing solid lung lesions that have been identified by a radiologist in CT images of the lung. For example, "CT Advanced Lung Analysis" (ALA) available from General Electric Company provides such a software tool. Moreover, the ALA software allows the radiologist to compare the size of a lesion over time.

However, such applications only allow for the analysis of solid lesions (S), discarding non-solid (NS) and part-solid (PS) lesions. It has been shown that these discarded lesions are of diagnostic value and are being discovered more often because of increasing image resolution and image quality. The ability to segment and measure only solid lesions leaves a gap in a radiologist's ability to provide diagnostic service due to a large proportion of the part-solid and the non-solid lesions in the total volume of interest (VOI).

While existing tools are suitable for their intended purpose, there remains a need in the art to provide radiologists with tools that allow them to determine solid and non-solid lesion volume and density attributes independently, and to be able to compare them over time.

BRIEF DESCRIPTION OF THE INVENTION

Embodiments of the invention include a method for analyzing a three-dimensional (3D) image representative of an initial volume of interest (VOI) containing a lesion. The 3D image has an associated binary map having voxels associated with a thresholded variance map of the initial VOI. The initial VOI has boundaries that may be defined by a cube. A final VOI is determined that is less than the initial VOI, where the final VOI is a function of the number of transitions from a boundary voxel to a filtered voxel at an outer boundary of the lesion. The final VOI is then analyzed to determine a nodule consistency class, classified based upon the computed nodule consistency class by applying a voxel-clustering algorithm, and displayed with respect to three classifications of tissue.

Other embodiments of the invention include a method used for analyzing a three-dimensional (3D) image representative of an initial volume of interest (VOI) containing a lesion. The 3D image has an associated binary map having voxels associated with a thresholded variance map of the initial VOI. The initial VOI has boundaries that may be defined by a cube. A seed is identified within the initial VOI and a multitude of first rays are projected from the seed toward each of the six faces of the cube, where a normal ray is defined by those first rays that have a direction normal to a face of the cube. With respect to each first ray and traveling outward from the seed, a point is identified on each first ray at which a first transition occurs from a boundary voxel to a filtered voxel, thereby defining a transition point. From each transition point, a second ray is projected onto the normal ray associated with the same cube face as the respective first ray. A final VOI is defined as that volume of voxels containing a defined percentage of the total number of projected second rays.

Further embodiments of the invention include a method for analyzing a three-dimensional (3D) image representative of an initial volume of interest (VOI) containing a lesion. The 3D image has an associated binary map having voxels associated with a thresholded variance map of the initial VOI. The initial VOI has boundaries that may be defined by a cube. A final VOI is determined that is less than the initial VOI, where the final VOI is a function of the number of transitions from a boundary voxel to a filtered voxel at an outer boundary of the lesion. Within the final VOI, three classifications of tissue are defined as a first set of voxels having a Hounsfield Unit (HU) value below a first threshold and representative of background, a second set of voxels having a HU value above the first threshold and below a second threshold and representative of non-solid tissue, and a third set of voxels having a HU value above the second threshold and representative of solid tissue. A morphological opening operation is applied to the final VOI, thereby removing partial volume effect details. A nodule consistency metric is computed. Subsequent to the defining of three classifications of tissue, the applying of a morphological opening operation, and the computing of a nodule consistency, the final VOI is analyzed to determine a nodule consistency class. The final VOI is classified based upon the computed nodule consistency class by: defining a first cluster of non-background voxels and a second cluster of non-background voxels based upon predefined thresholds; applying a K-means clustering algorithm to redefine the first and second clusters by iteratively checking to see whether a given voxel in the first cluster is closer to the center of its cluster or to the center of the second cluster, and if the voxel is closer to the center of the second cluster, then moving it into the second cluster; and, assigning the redefined first cluster of voxels to one tissue classification, and assigning the redefined second cluster of voxels to another tissue classification. The final VOI is then displayed with respect to the three classifications of tissue.

Yet further embodiments of the invention include a computer program product for analyzing a three-dimensional (3D) image representative of an initial volume of interest (VOI) containing a lesion, the 3D image having an associated binary map resulting from a thresholding of the variance map of the initial VOI, and the initial VOI having boundaries that may be defined by a cube. The product includes a storage medium, readable by a processing circuit, storing instructions for execution by the processing circuit for practicing embodiments of the aforementioned methods.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a method for analyzing a three-dimensional (3D) image representative of an initial volume of interest (VOI) containing a lesion (nodule), the 3D image having an associated binary map resulting from a thresholding of a variance map of the initial VOI, where the initial VOI has boundaries that may be defined by a cube. While embodiments described herein may depict a cube as an exemplary defining boundary for the initial VOI, it will be appreciated that the disclosed invention is also applicable to other geometric boundaries, such as a sphere for example.

Figure 1:
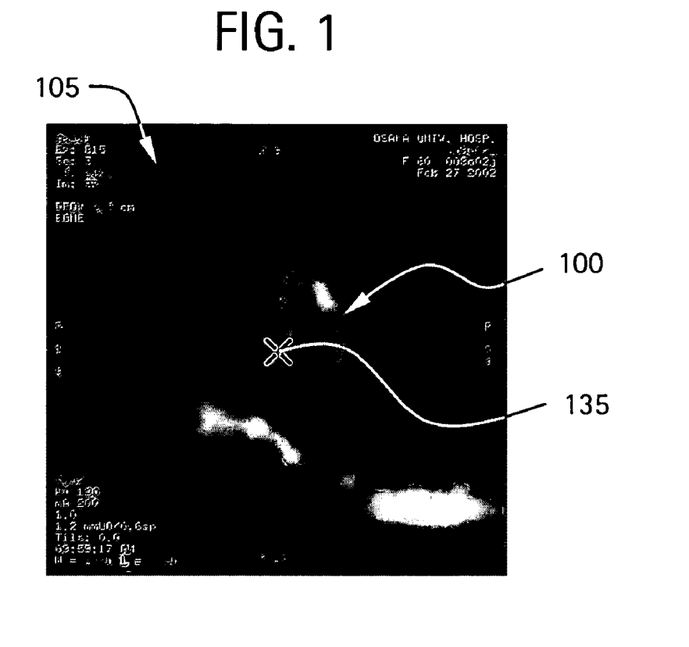
FIG. 1 depicts an exemplary 3D image of a nodule having solid and non-solid tissue for use in accordance with embodiments of the invention.

Referring to FIG. 1, a 3D image of a nodule 100 having solid and non-solid tissue is depicted by voxels having varying Hounsfield Unit (HU) values. From this data, a statistical variance map (variance texture map) may be computed on each voxel, in a large enough VOI, on a local neighborhood.

Figure 2:
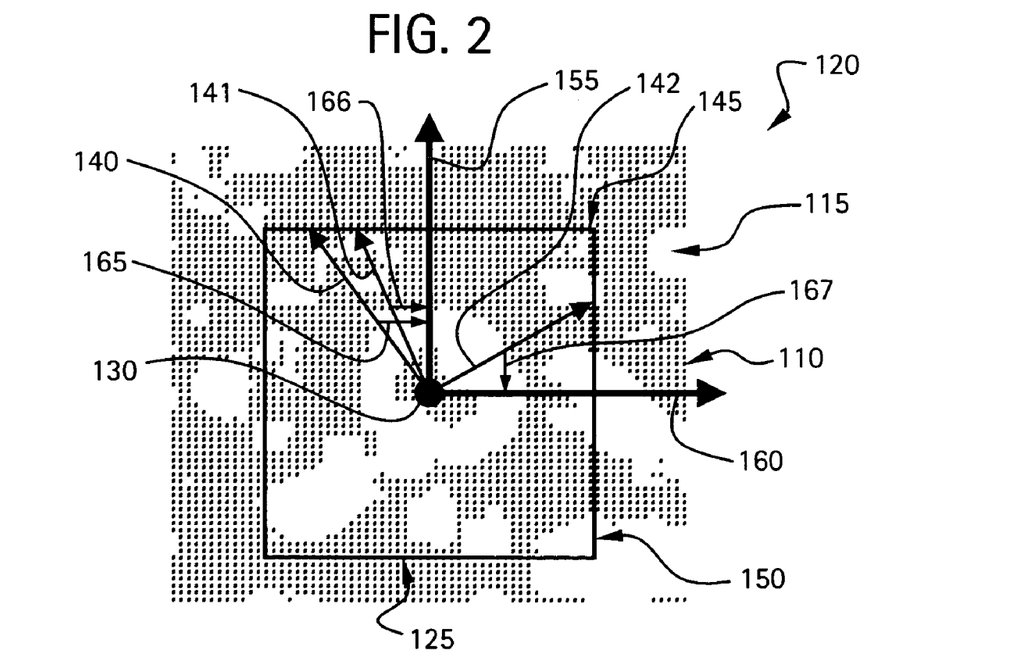
FIG. 2 depicts an exemplary 3D binary map representing a thresholded variance map of the nodule of FIG. 1 for use in accordance with embodiments of the invention.

FIG. 2 depicts an exemplary variance texture map that was computed for each voxel (in a suitably large VOI) on a local neighborhood whose size was dependent on the acquisition and reconstruction parameters. The exemplary map depicted was thresholded so as eliminate variance due to the intrinsic acquisition and reconstruction noise. For example, for a 1.25 mm slice thickness exam with an in-plane voxel size of 0.7 mm and a diagnostic dose acquisition reconstructed with a bone kernel, the neighborhood size was 3×3×3 voxels and the threshold was set to 60HU.

Values of the variance map below 60, which are representative of noise, are filtered out and are herein referred to as filtered voxels 110, and values above 60 are assigned to the class of boundary voxels 115, resulting in a binary map 120, as depicted in FIG. 2, which is a side view of a 3D cube defining a boundary of an initial VOI 125. As previously mentioned, the binary map 120 is also herein referred to as a variance texture map.

Figure 3:
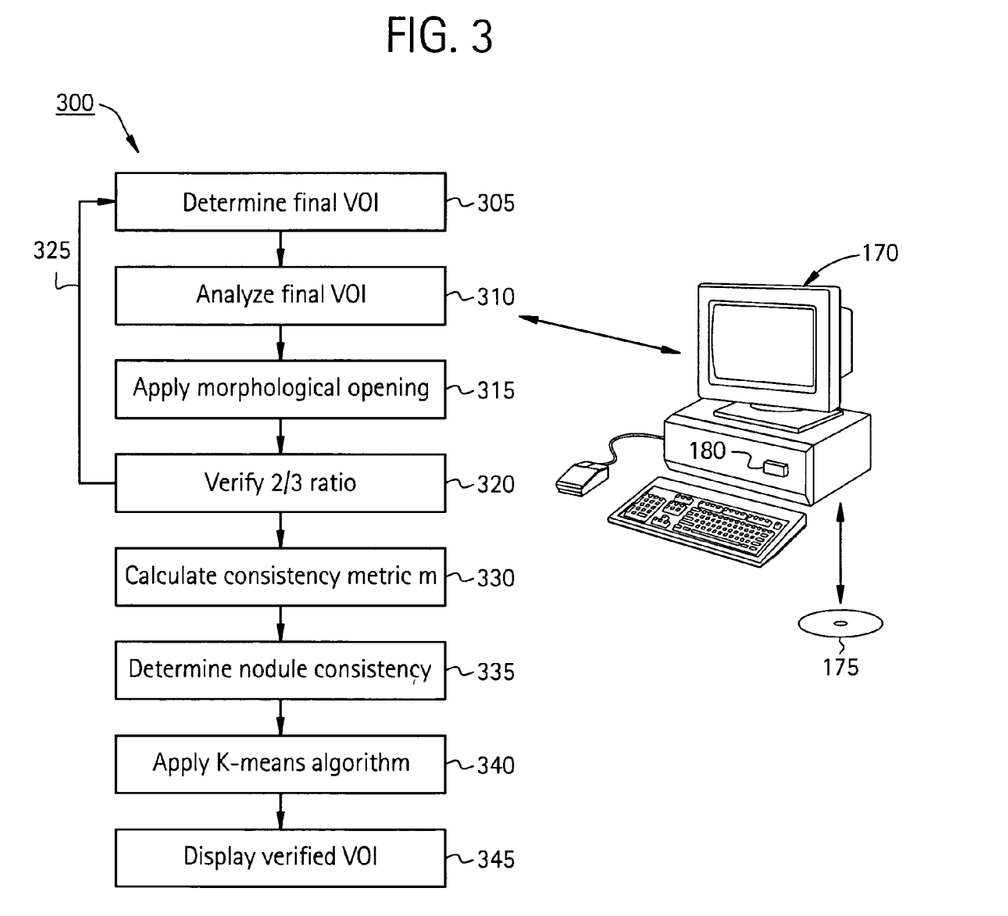
FIG. 3 depicts an exemplary method in accordance with embodiments of the invention and an exemplary apparatus for implementing embodiments of the invention.

Referring now to FIGS. 1-4 in combination, a method 300 for analyzing a three-dimensional (3D) image representative of an initial VOI 125 containing a lesion (nodule) 100 will now be discussed. FIG. 3 also depicts a computer 170 having a storage medium 175, readable by a processing circuit 175, storing instructions for execution by the processing circuit 175 for carrying out embodiments of the invention.

Figure 4:
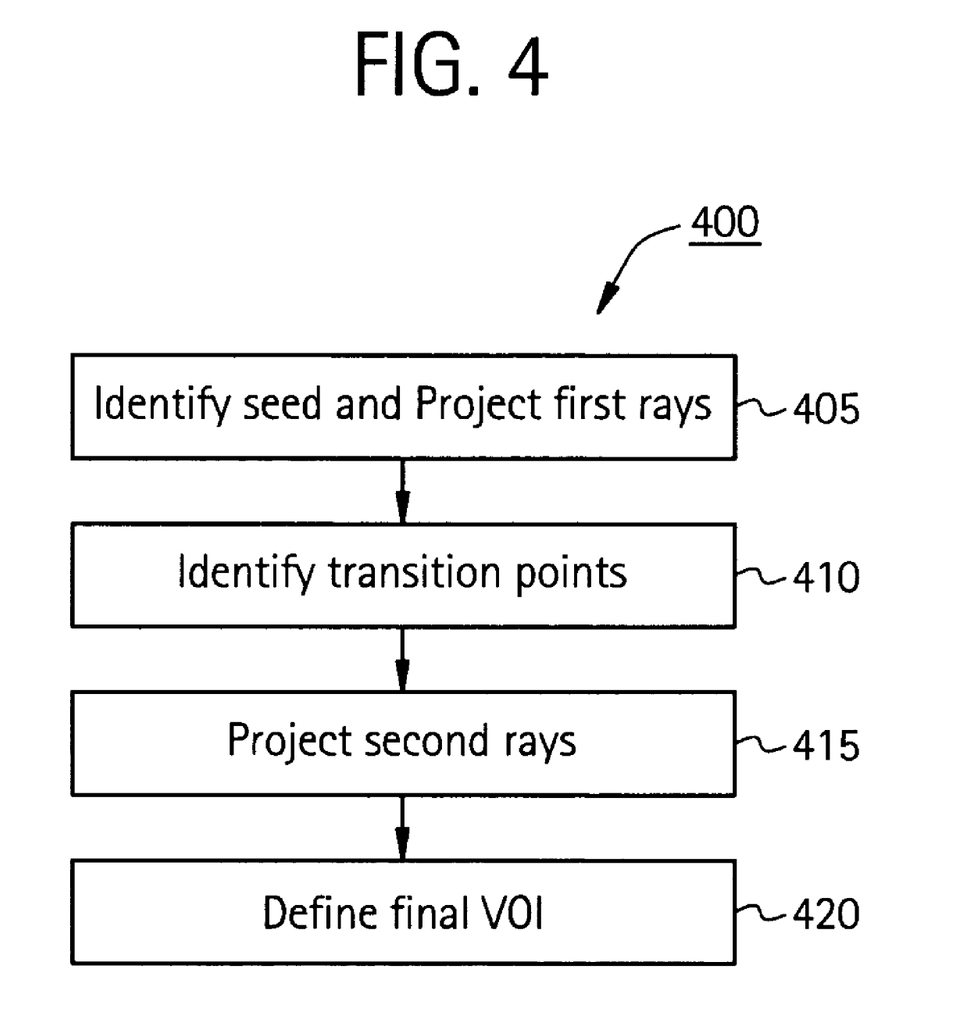
FIG. 4 depicts an exemplary method in accordance with embodiments of the invention.

At block 305 of FIG. 3, a final VOI is determined in accordance with the method 400 depicted in FIG. 4, where at block 405, a seed 130 is identified within nodule 100 by an operator placing a crosshair 135 at nodule 100, thereby establishing a reference coordinate with respect to the voxels of the initial VOI 125 in binary map 120. A multitude of first rays 140, 141, 142 are projected from the seed 130 toward each of the six faces that define the outer boundary of the 3D cube, which is represented generally by numeral 125 in FIG. 2. First rays 140, 141 are directed to a top face 145 of 3D cube 125, and first ray 142 is directed to a side face 150 of 3D cube 125. While FIG. 2 depicts only three first rays 140, 141, 142, it will be appreciated that this is for clarity and illustration purposes only, and that first rays 140, 141, 142 are representative of a multitude of first rays oriented in all directions and originating from seed 130. In an embodiment, there are about 256 first rays that are directed to each boundary face of 3D cube 125. A first ray that is normal to a face of 3D cube 125 is herein referred to as a normal ray. In FIG. 2, normal ray 155 is normal to top face 145 and normal ray 160 is normal to side face 150.

With respect to each first ray 140, 141, 142 and traveling outward from seed 130, method 400 identifies 410 a point on each first ray where a first transition occurs from a boundary voxel 115 to a filtered voxel 110, thereby defining a transition point, which is represented by the non-arrow-head-end of second rays 165, 166, 167. Second rays 165, 166, 167 are projected 415 from the respective transition point in a direction perpendicular to and toward the normal ray associated with the same cube face as the respective first ray. For example, first rays 140, 141 are associated with top face 145, and normal ray 155 is associated with top face 145. Thus, second rays 165 and 166, originating from first rays 140, 141 are projected to normal ray 155. Likewise with respect to first ray 142, normal ray 160 and second ray 167. While not specifically illustrated, it will be appreciated that this association of first rays, normal rays, and second rays continues for all of the points of a first transition from a boundary voxel 115 to a filtered voxel 110. At block 420, method 400 defines a final VOI as that volume of voxels containing a defined percentage, such as 90% for example, of the total number of projected second rays in the initial VOI 125. As such, method 300, referring now back to FIG. 3, determines a final VOI that is less than the initial VOI, where the final VOI is a function of the number of transitions from a boundary voxel 115 to a filtered voxel 110 at an outer boundary of the lesion 100.

Having determined a final VOI in order to determine the nodule consistency (solid/non-solid/part-solid), method 300 then analyzes 310 the final VOI to distinguish three classifications of tissue that are defined by a first set of voxels having a Hounsfield Unit (HU) value below a first threshold and representative of background, a second set of voxels having a HU value above the first threshold and below a second threshold and representative of non-solid tissue, and a third set of voxels having a HU value above the second threshold and representative of solid tissue. In an exemplary embodiment, the first HU value threshold is about −700HU, and the second HU value threshold is about −300HU.

To further refine the final VOI to allow for a better discrimination between tissue types, a known morphological opening operation may be applied 315 to the final VOI, thereby removing partial volume effect details, such as partial volume voxels resulting from acquisition and reconstruction parameters of the scan, which are voxels that may be mistakenly classified as non-solid tissue. As is known, the opening operation includes eroding the final VOI by removing a defined number of layers of voxels, thereby resulting in a modified VOI, and dilating the modified VOI by the same amount that it was eroded by. The number of layers of voxels that are eroded are determined to account for the acquisition and reconstruction parameters of the scan.

For high quality images, it is preferred that the final VOI have a volume of background voxels that is equal to or greater than, for example, about ⅔ of the total volume of voxels of all three tissue classes combined. Accordingly, method 300 computes the volume for each of the three classes of tissue, and verifies 320 that the background class represents at least ⅔ of the volume of the final VOI. If not, then method 300 is repeated 325 after the operator enlarges the initial VOI until such ⅔ ratio is achieved.

Figure 5:
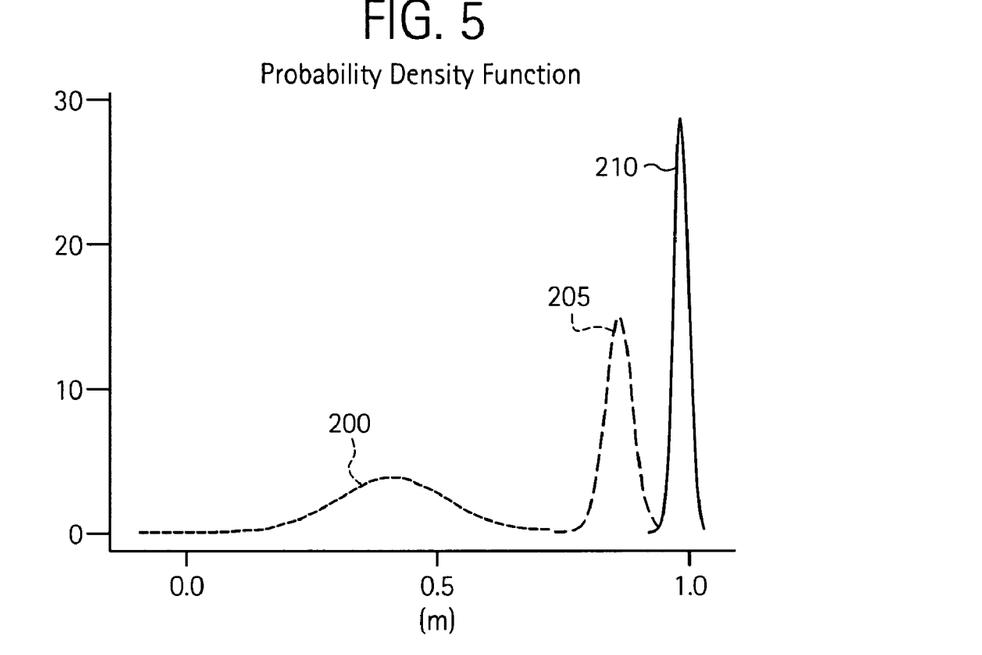
FIGS. 5 and 6 illustrate the results of a statistical analysis with respect to a nodule consistency metric for use in accordance with embodiments of the invention.
Figure 6:
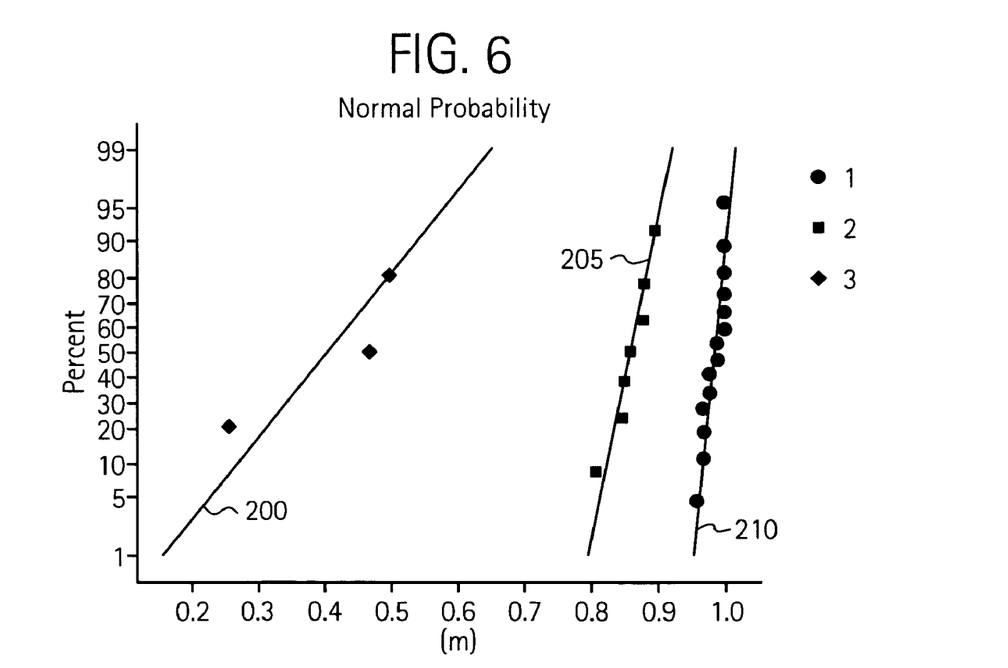

Using the volume of non-solid (NS) and solid (S) voxels, a nodule consistency metric m may be calculated 330 in order to enable efficient discrimination between nodule consistency classes. Here, the nodule consistency metric m is defined as m=1−NS/(NS+S). To assist in the determination of optimal thresholds for discriminating between tissue classes, a statistical analysis was performed on a population of nodules for which the consistency was known. The consistency metric m was computed for each nodule consistency type in the population and a gaussian distribution was fitted onto the consistency metric for each nodule consistency. The resulting probability density function and normal probability as a function of the consistency metric m are depicted in FIGS. 5 and 6 for non-solid nodules 200, part-solid nodules 205, and solid nodules 210. As can be seen, a consistency metric m equal to about 0.4 is representative of a non-solid nodule, a consistency metric m equal to about 0.85 is representative of a part-solid nodule, and a consistency metric m equal to about 0.99 is representative of a solid nodule.

Thus, by applying a predetermined nodule consistency metric m to identify tissue classes, the nodule consistency may be determined 335 with a high degree of repeatability from the reading of one lesion to the reading of a second different lesion. In an exemplary embodiment, the threshold on the consistency metric m is determined by the intersection of two gaussian distributions, drawn from a known nodule population with different consistencies, according to the following equation, which is solved for the threshold value x:

$$1/\sigma_1 * \exp((x-\mu_1)^2/\sigma_1^2) = 1/\nu_2 * \exp(((x-\mu_2)^2/\sigma_2^2)),$$

where $\sigma_1$ is a predetermined variance of a first nodule consistency, $\mu_1$ is a predetermined mean of the first nodule consistency, $\sigma_2$ is a predetermined variance of a second nodule consistency, and $\mu_2$ is a predetermined mean of the second nodule consistency. For distinguishing between three consistencies, the aforementioned intersection equation is solved twice. The first time, the intersection equation is solved for the threshold between the probability density functions of non-solid and part-solid nodules, and the second time, the intersection equation is solved for the threshold between the probability density functions of part-solid and solid nodules.

Figure 7A:
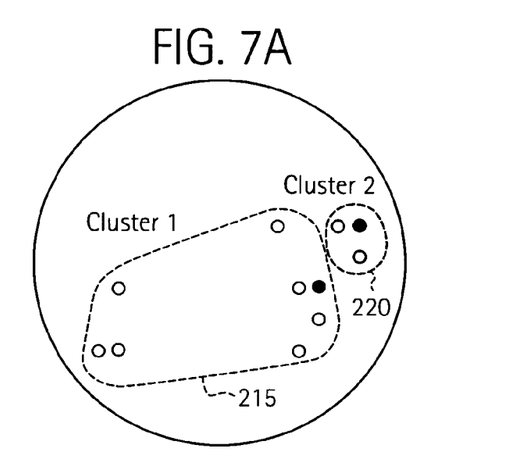
FIGS. 7A, B and C illustrate the implementation of an exemplary K-means clustering algorithm for use in accordance with embodiments of the invention.
Figure 7B:
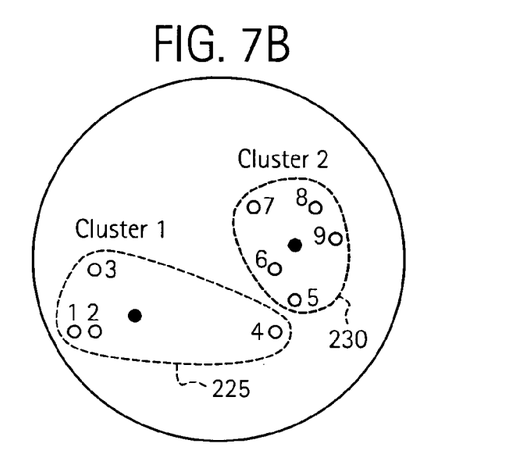
Figure 7C:
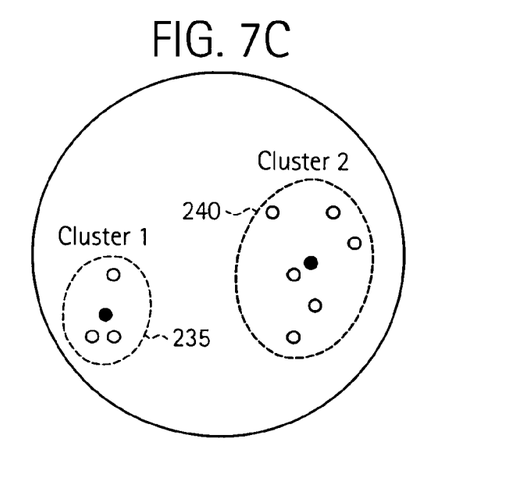

A further improvement to method 300 for tissue classification may be conducted after the voxels of the final VOI have been initially classified using the aforementioned thresholds, and the consistency of the nodule determined, by applying 340 a known K-means clustering algorithm to the final VOI. Here, and referring now to FIGS. 7A, B and C, a first cluster 215 of non-background voxels and a second cluster 220 of non-background voxels are defined (see FIG. 8A). The K-means clustering algorithm is then applied with a specific distance metric to redefine the first and second clusters as third and fourth clusters 235, 240, via intermediate clusters 225, 230 (see FIGS. 7B and C). In an exemplary method, the K-means clustering algorithm uses a Euclidean distance as a metric with respect to two sets of points (voxels), which are initially the first and second clusters 215, 220. The algorithm works by iteratively checking to see whether a given point in a set is closer to the center of its set or to the center of the other set. If the point is closer to the center of the other set, then it is moved into the other set. The algorithm proceeds in this manner until no more points are moved from one set to the other. At the conclusion of the algorithm, the third and fourth clusters of voxels are assigned to different tissue classifications. In an embodiment of the K-means algorithm, the distance metric is defined as a combination of the difference in gray-levels on the voxels, the difference in average gray-level in a local neighborhood, and the difference in a texture measurement on a local neighborhood (such as variance for example).

Figure 8:
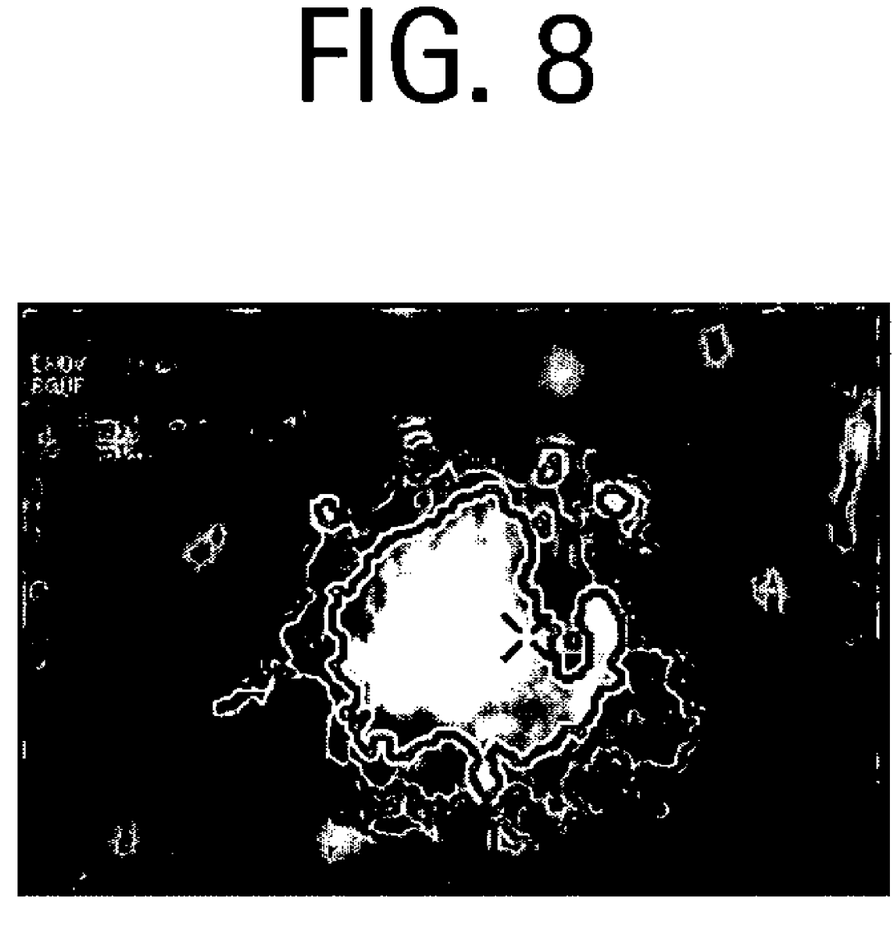
FIG. 8 depicts an exemplary resultant display in accordance with embodiments of the invention.

At block 345, and referring now to FIG. 8, the verified and enhanced VOI is displayed with the three classifications of tissue clearly delineated by borders. Since the three classes of tissue are differentiable, method 300 may also assign a color to each class for greater visual effect.

While embodiments of the invention have been described employing a K-means clustering algorithm for discriminating between tissue classes, it will be appreciated that the scope of the invention is not so limited, and that other algorithms, such as NN and KL transforms for example, may also be used for discriminating between tissue classes.

While embodiments of the invention have been described with reference to lesions found in CT images of a lung, it will be appreciated that the scope of the invention is not so limited, and that the invention may also apply to other anatomies and/or imaging modalities where two or more anatomical objects need to be distinguished.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to analyze a three-dimensional (3D) image containing a lesion for distinguishing between background, non-solid and solid tissue.

As disclosed, some embodiments of the invention may include some of the following advantages: the ability to automatically and in real-time determine the consistency of a nodule and an appropriately sized associated volume of interest (VOI) that includes the nodule as well as a certain amount of background for further 3D analysis of the nodule; the ability to classify the voxels within a VOI so as to identify optimal boundaries between tissue classes, such as parenchyma, non-solid tissue, and solid tissue) using density values as well as local texture criteria, which may be determined using the framework of a K-means algorithm; the ability to visualize the results of the segmentation in a 3D volume rendering (VR) that visually distinguishes solid from non-solid tissue in all nodules; on the fly computation of a VOI using local texture maps; on the fly computation of nodule consistency; and, the efficient use of available K-means distance metrics and initialization criteria for clustering tissues in CT images of lungs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for analyzing a three-dimensional (3D) image representative of an initial volume of interest (VOI) containing a lesion, the 3D image having an associated binary map comprising voxels associated with a thresholded variance map of the initial VOI the initial VOI having boundaries that may be defined by a cube, the method comprising:
   determining a final VOI that is less than the initial VOI, the final VOI being a function of the number of transitions from a boundary voxel to a filtered voxel at an outer boundary of the lesion;
   analyzing the final VOI to determine a nodule consistency class; and
   classifying the VOI based upon the computed nodule consistency class by applying a voxel-olustering algorithm; and
   displaying the final VOI with respect to three classifications of tissue;
   wherein the determining a final VOI comprises:
   identifying a seed within the initial VOI and projecting a multitude of first rays from the seed toward each of the six faces of the cube, a normal ray being defined by those first rays that have a direction normal to a face of the cube;
   with respect to each first ray and traveling outward from the seed, identifying a point on each first ray at which a first transition occurs from a boundary voxel to a filtered voxel, thereby defining a transition point;
   from each transition point, projecting a second ray onto the normal ray associated with the sanie cube face as the respective first ray;
   defining a final VOI as that volume of voxels containing a defined percentage of the total number of projected second rays;
   using the final VOI to distinguish data representative of solid tissue and non-solid tissue from background, the three classifications of tissue, thereby enabling determination of an outer boundary of the lesion.

2. The method of claim 1, wherein:
   the three classifications of tissue are defined by a first set of voxels having a Hounsfield Unit (HU) value below a first threshold and representative of the background, a second set of voxels having a I-LU value above the first threshold and below a second threshold and representative of the non-solid tissue, and a third set of voxels having a HU value above the second threshold and representative of the solid tissue.

3. The method of claim 2, further comprising:
   applying a morphological opening operation to the final VOI, thereby removing partial volume effect details.

4. The method of claim 3, wherein the opening operation comprises:
   eroding the final VOI by removing a defined number of layers of voxels, thereby resulting in a modified VOI; and
   dilating the modified VOI by the same amount that it was eroded.

5. The method of claim 3, further comprising:
   computing a volume of each of the three classifications of tissue and verifying that the volume of the background class is equal to or greater than about ⅔ of the total volume of the three classes combined.

6. The method of claim 3, further comprising:
   computing a nodule consistency metric.

7. The method of claim 6, wherein the nodule consistency metric is a function of the volume of the non-solid tissue and the volume of the solid tissue.

8. The method of claim 7, further comprising:
   distinguishing between nodule consistencies by applying a predetermined nodule consistency threshold x that is determined by the intersection of two gaussian distributions drawn from a known nodule population with different consistencies according to the following equation:

$$1/\sigma_1 * \exp((x-\mu_1^2) = 1/\sigma_2 * \exp(((x-\mu_2)^2/\sigma_2^2),$$

where $\sigma$ is a predetermined variance of a first nodule consistency, $\mu_1$ is a predetermined mean of the first nodule consistency, $\sigma_2$ is a predetermined variance of a second nodule consistency, and $\mu_2$ is a predetermined mean of the second nodule consistency.

9. The method of claim 8, wherein the distinguishing further comprises:
   solving for the intersection x of the two gaussian distributions twice, the first time solving for the threshold between non-solid and part-solid nodules, and the second time solving for the threshold between part-solid and solid nodules.

10. The method of claim 2, wherein the applying a voxel-clustering algorithm comprises:
    defining a first cluster of non-background voxels and a second cluster of non-background voxels based upon predefined thresholds;
    applying a K-means clustering algorithm to redefine the first and second clusters by iteratively checking to see whether a given voxel in the first cluster is closer to the center of its cluster or to the center of the second cluster, and if the voxel is closer to the center of the second cluster, then moving it into the second cluster; and
    assigning the redefined first cluster of voxels to one tissue classification, and assigning the redefined second cluster of voxels to another tissue classification.

11. A method used for analyzing a three-dimensional (3D) image representative of an initial volume of interest (VOI) containing a lesion, the 3D image having an associated binary map comprising voxels associated with a thresholded variance map of the initial VOI, the initial VOI having boundaries that may be defined by a cube, the method comprising:
    identifying a seed within the initial VOI and projecting a multitude of first rays from the seed toward each of the six faces of the cube, a normal ray being defined by those first rays that have a direction normal to a face of the cube;
    with respect to each first ray and traveling outward from the seed, identifying a point on each first ray at which a first transition occurs from a boundary voxel to a filtered voxel, thereby defining a transition point;
    from each transition point, projecting a second ray onto the normal ray associated with the same cube face as the respective first ray; and
    defining a final VOI as that volume of voxels containing a defined percentage of the total number of projected second rays; and using the final VOI to distinauish data representative of solid tissue and non-solid tissue from background, three classifications of tissue, thereby enabling determination of an outer boundary of the lesion.

12. The method of claim 11, further comprising:
analyzing the final VOI to distinguish the three classifications of tissue defined by a first set of voxels having a Hounsfield Unit (HU) value below a first threshold and representative of the background, a second set of voxels having a HU value above the first threshold and below a second threshold and representative of the non-solid tissue, and a third set of voxels having aHU value above the second threshold and representative of the solid tissue.

13. The method of claim 12, further comprising:
applying a morphological opening operation having a defined opening size to the final VOI, thereby removing partial volume effect details.

14. The method of claim 13, further comprising:
computing a volume of each of the three classifications of tissue and verifying that the volume of the background class is equal to or greater than about ⅔ of the total volume of the three classes combined.

15. A computer program product for analyzing a three-dimensional (3D) image representative of an initial volume of interest (VOI) containing a lesion, the 3D image having an associated binary map resulting from a thresholding of the variance map of the initial VOI, the initial VOI having boundaries that may be defined by a cube, the product comprising:
a storage medium, readable by a processing circuit, storing instructions for execution by the processing circuit for;
identifying a seed within the initial VOl and projecting a multitude of first rays from the seed toward each of the six faces of the cube, a normal ray being defined by those first rays that have a direction normal to a face of the cube;
with respect to each first ray and traveling outward from the seed, identifying a point on each first ray at which a first transition occurs from a boundary voxel to a filtered voxel, thereby defining a transition point;
from each transition point, projecting a second ray onto the normal ray associated with the same cube face as the respective first ray; and
defining a final VOI as that volume of voxels containing a defined percentage of the total number of projected second rays.

16. The product of claim 15, wherein the storage medium, readable by a processing circuit, further stores instructions for execution by the processing circuit for:
analyzing the final VOI to distinguish three classifications of tissue defined by a first set of voxels having a Hounsfield Unit (HU) value below a first threshold and representative of background, a second set of voxels having a HU value above the first threshold and below a second threshold and representative of non-solid tissue, and a third set of voxels having a HU value above the second threshold and representative of solid tissue.

17. The product of claim 16, wherein the storage medium, readable by a processing circuit, further stores instructions for execution by the processing circuit for:
applying a morphological opening operation having a defined opening size to the final VOI, thereby removing partial volume effect details.

18. The product of claim 17, wherein the storage medium, readable by a processing circuit, further stores instructions for execution by the processing circuit for:
computing a volume of each of the three classifications of tissue and verifying that the volume of the background class is equal to or greater than about ⅔ of the total volume of the three classes combined.

19. A method for analyzing a three-dimensional (3D) image representative of an initial volume of interest (VOI) containing a lesion, the 3D image having an associated binary map comprising voxels associated with a thresholded variance map of the initial VOL. the initial VOI having boundaries that may be defined by a cube, the method comprising:
determining a final VOI that is less than the initial VOI, the final VOI being a function of the number of transitions from a boundary voxel to a filtered voxel at an outer boundary of the lesion;
within the final VOI, defining three classifications of tissue as a first set of voxels having a Hounsfield Unit (HU) value below a first threshold and representative of background, a second set of voxels having a HU value above the first threshold and below a second threshold and representative of non-solid tissue, and a third set of voxels having a HU value above the second threshold and representative of solid tissue;
applying a morphological opening operation to the final VOI, thereby removing partial volume effect details;
computing a nodule consistency metric;
subsequent to the defining three classifications of tissue, the applying a morphological opening operation, and the computing a nodule consistency, analyzing the final VOI to determine a nodule consistency class;
classifying the final VOI based upon the computed nodule consistency class by:
defining a first cluster of non-background voxels and a second cluster of non-background voxels based upon predefmed thresholds;
applying a K-means clustering algorithm to redefine the first and second clusters by iteratively checking to see whether a given voxel in the first cluster is closer to the center of its cluster or to the center of the second cluster, and if the voxel is closer to the center of the second cluster, then moving it into the second cluster; and
assigning the redefined first cluster of voxels to one tissue classification, and assigning the redefined second cluster of voxels to another tissue classification; and
displaying the final VOI with respect to the three classifications of tissue; and
using the final VOI to distinguish data representative of the solid tissue and non-solid tissue from background, the three classifications of tissue, thereby enabling determination of an outer boundary of the lesion.

* * * * *